PANORAMIC SYSTEM

Filed June 30, 1955 2 Sheets-Sheet 1

INVENTORS
WILLIAM I. L. WU &
BERNARD SCHLESSEL
BY
ATTORNEY

PANORAMIC SYSTEM

Filed June 30, 1955 2 Sheets-Sheet 2

CATHODE - RAY TUBE DISTORTED BEAM

BEAM TRACE AS IT APPEARS

INPUT AND MARKER SIGNALS

INVENTORS
WILLIAM I. L. WU
&
BERNARD SCHLESSEL
BY [signature]
ATTORNEY

United States Patent Office 2,831,146

Patented Apr. 15, 1958

2,831,146

PANORAMIC SYSTEM

William I. L. Wu, Forest Hills, and Bernard Schlessel, Brooklyn, N. Y., assignors to Panoramic Radio Products, Inc., Mount Vernon, N. Y., a corporation of New York Application June 30, 1955, Serial No. 519,059

17 Claims. (Cl. 315—26)

The present invention relates generally to frequency scanning panoramic systems, and more particularly to systems of panoramic presentation in which accurate frequency marker pips are visually presented on the face of a cathode ray tube indicator concurrently with a pip visually representative of a frequency variable signal, the marker and signal pips being generated in sequence on the face of the indicator, and in distinguishable display.

Briefly describing the present invention, a plurality of crystal oscillators of different frequencies are employed to generate frequency marker pips on the face of a cathode ray tube indicator. It is also desired to present a pip representative against a frequency scale of the frequency of a sub-carrier oscillator which may vary slightly in frequency. The sub-carrier oscillator may have a frequency equal to or quite close to the frequency of any one of the marker oscillators. In these circumstances, if the sub-carrier oscillator signal and the marker oscillator signal are simultaneously supplied to a frequency scanning channel of a panoramic receiver, the signals superposed or nearly superposed in frequency will interact and beat, with consequent confusion of the presentation.

It is a feature of the present invention that the marker signals generated by the separate crystal oscillators, and the sub-carrier oscillator signal, are applied to a frequency scanning channel in sequence, one set during each scan, and in a predetermined relative order. When the sub-carrier oscillator is applied the cathode ray beam of the oscilloscope is velocity modulated at a rapid rate. This action is equialent to a periodic and rapid interruption of the sub-carrier oscillator signal, in terms of the presentation provided by the cathode ray tube indicator, so that the sub-carrier oscillator signal is visually presented in the form of a broken or interrupted line, and its visual presentation is readily distinguishable from the uninterrupted or smooth pips due to the crystal oscillator signals.

By reason of the distinguishable presentations and the alternate presentations the sub-carrier oscillator representative pip and the marker pips are readily distinguishable from each other, and do not interact when superposed or nearly superposed in frequency and amplitude, and slight frequency differences which may exist therebetween are readily observable and accurately and reliably measurable.

It is a broad object of the present invention to provide a novel frequency scanning panoramic system.

It is a further broad object of the present invention to provide a novel system of panoramic presentation, in which marker pips and signal pips are commonly visually displayed against a common base line, the displays being successively generated in alternation.

Another object of the present invention is to provide distinguishable visual displays representative of a plurality of signal frequencies, by interrupting the visual display due to at least a selected one or selected ones of the signal frequencies only.

It is another object of our invention to provide a system of panoramic presentation in which two signals of adjacent frequencies are visually displayed without beats or interaction between the signals.

It is still a further object of the present invention to provide a visual display in terms of a broken or interrupted line, by velocity modulating the line generating element of a display generator at a velocity above that required to generate an effective display.

It is a more specific object of the present invention to provide a non-ambiguous display on the face of a cathode ray tube spectrum analyzer which is representative of the frequency of an input signal, and of two comparison signals, the frequencies being so similar that if simultaneously applied to the input circuits of a conventional sweeping spectrum analyzer, interaction would occur, and the displays due to the several signals would overlap, and to establish the frequency relationships of the several signals and their identities unambiguously from the display.

The above and still further features, objects, and advantages of the present invention will become apparent upon consideration of the following detailed description of a specific embodiment of the invention, especially when taken in conjunction with the accompanying drawings, wherein.

Figure 1:
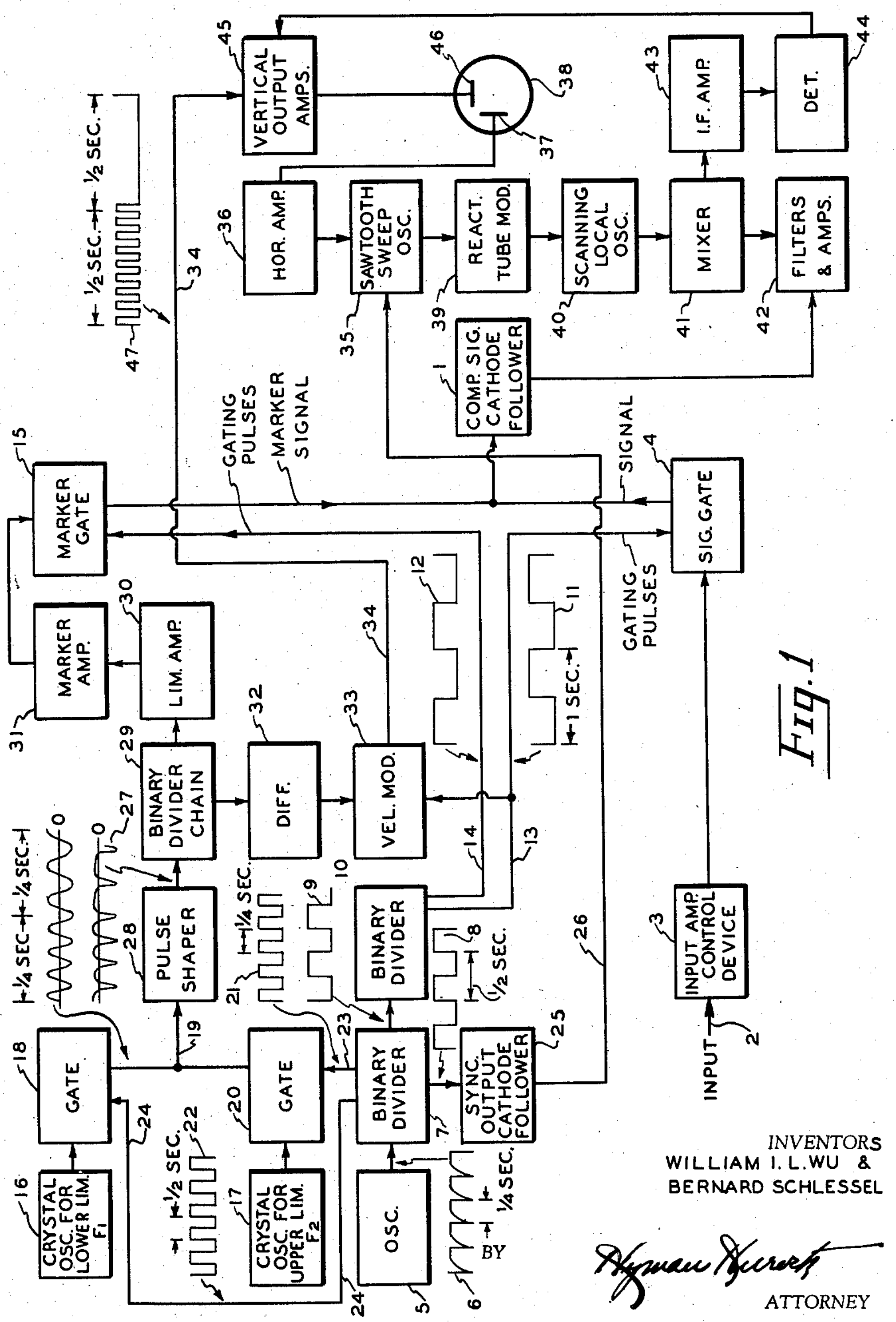
Figure 1 is a block diagram of a system according to the invention.

Referring now more particularly to the accompanying drawings, the reference numeral 1 denotes a composite signal cathode follower, to which is applied in time succession a signal from an external source, via lead 2, and the frequency of which is to be visually indicated, and signals controlled as to frequency by first and second marker oscillators, and normally respectively above and below the frequency of the externally applied signal. To control timing of application of signals to cathode follower 1, the signals applied to lead 2 are applied via an input amplitude control device 3 to a signal gate 4, which passes the signals to cathode follower 1 when supplied with positive gating pulse, and blocks them when supplied with negative gating pulse. The gating pulse referred to is controlled from a four (4) C. P. S. oscillator 5, which supplies short negative pulses 6, at ¼ second intervals. The pulses 6 are applied to a first binary divider 7, which supplies 2 C. P. S. square pulses 8, 9 at two distinct output terminals in respectively opposite phases. The pulses 9 are applied to a further binary divider 10, which supplies 1 C. P. S. square output pulses 11, 12, of respectively opposite phase or polarity, to leads 13, 14, respectively. The pulses 11, when positive, set the signal gate 4 to "off," and when negative turns on the gate, 4, so that signals cannot pass. The pulses 12 similarly control a marker signal gate 15, which determines whether or not marker signals shall pass to the cathode follower 1.

The marker signals are controlled as a frequency from two highly stable crystal controlled oscillators 16 and 17. The oscillator 16 provides essentially sinusoidal output at frequency $F_1$, to control a frequency below the desired frequency of the input signal on lead 2, and the oscillator 17 provides sinusoidal output at frequency $F_2$, to control a frequency above the desired frequency supplied to lead 2. The latter frequency may vary between frequency limits established basically by the oscillators $F_1$, $F_2$, but which specifically are derived by frequency division therefrom.

The output at frequency $F_2$, provided by oscillator 16, is supplied to a gate 18, which, when open, supplies that output to lead 19. Similarly, the output of oscillator 17 is supplied to gate 20, which, when open, supplies the latter output to lead 19.

The gates 18, 20 are turned on and off, respectively, in alternation, in response to oppositely phased or poled sets of gating signals 21, 22, supplied to leads 23, 24, respectively, by binary divider 7, and which have a period of ½ second. The signals supplied to leads 23, 24 are equal in frequency, together with those supplied to binary divider 10 have been frequency divided and have a frequency of 2 C. P. S. The 2 C. P. S. signals 8 are supplied to a cathode follower 25, and employed as sweep synchronizing signals, which are applied to lead 26.

The oscillations provided to lead 19 are shaped, as at 27, by a pulse shaper 28 and the shaped pulses 27 applied to a binary divider chain 29, which reduces the frequencies $F_1$ and $F_2$ to values which are respectively the desired frequencies above and below the expected mean frequency of the input signal applied to input lead 2. The output pulses from the divider chain 29 are amplitude limited in limiter amplifier 30, and applied to amplifier 31. The sets of marker signals are accordingly rigidly frequency controlled by crystal controlled oscillators 16, 17, and are supplied in alternation for ¼ second intervals to marker amplifier 31. The latter is permitted to amplify and pass marker signals by marker gate 15 at ½ second intervals, for half second periods, so that one complete set of marker signals, including two pulses of different carrier frequencies, are passed in the ½ second intervals. When marker gate 15 prevents the amplification and flow of marker signals through marker amplifier 31, input signal is allowed to pass to cathode follower 1 by signal gate 4. The influence of marker gate 15 on marker amplifier 31 is controlled by gating pulses 12 provided through lead 14.

An output of the binary divider chain 29, taken at any suitable stage thereof, is differentiated in a differentiator 32, which in turn provides sharp, rapidly varying, velocity modulation pulses to a velocity modulator 33, in the nature of a gate. The modulator 33 is gated off and on by gating pulses 11, in such fashion that velocity modulation signal is supplied to lead 34 while gate 4 is on, but not while gate 15 is on. The velocity modulation pulses consist of sharp, short pulses, and serve to distinguishably mark or interrupt only the visual display due to the input signal, in a manner hereinafter explained.

It will be noted that the positive synchronizing pulses supplied by cathode follower 25 are at ½ second intervals, so that a first sweep occurs while input signals are supplied to a composite signal cathode follower 1, and a succeeding sweep occurs during the time marker signals are supplied to composite signal cathode follower 1.

The synchronizing pulse signals supplied by lead 26 are applied to a sawtooth sweep oscillator 35, synchronizing the operation of the latter so that one sweep occurs for each positive pulse. The output sweep voltage is amplified in amplifier 36, and applied as sweep voltage to the horizontal deflection electrodes 37 of a cathode ray tube indicator 38. The sweep voltage is further applied to a reactance tube modulator 39. The latter is in circuit with a scanning local oscillator 40, causing the latter, in response to the sawtooth output of oscillator 35 to vary in frequency over a suitable range of values.

The output of sweep oscillator 40, the output of composite signal cathode follower 1, are furnished to a mixer 41, the latter signal after suitable filtering and amplification in filter and amplifier 42, which remove noise and undesired harmonics, and raises the level of the input signal to a value suitable for mixing.

The output of mixer 41 is selected by a narrow band I. F. filter 43, having a band-pass of sufficiently small width that the several signals supplied to the input of the mixer 41 may be brought in sequence into the passband of the I. F. amplifier 41, as the sweep oscillator 40 sweeps through its range of frequencies. The output of I. F. amplifier 43 is detected by detector 44, suitably amplified, in vertical output amplifier 45, and applied to the vertical plates 46 of cathode ray tube indicator 38.

The velocity modulation pulses 47, supplied over lead 34, are likewise supplied to vertical output amplifier 45, causing extremely rapid variations of output amplitude of that amplifier, which are, however, small in amplitude relative to the responses due to the output of the detector 44.

The deflections of the beam of cathode ray tube indicator 38, in response to velocity modulation pulses 47, are sufficiently rapid that no visual trace occurs in response thereto. The net effect on the visual trace is then that of periodic interruptions, which occur at a periodicity so great in relation to sweep times employed that visual traces occur as a series of dots or short lines.

Figure 2:
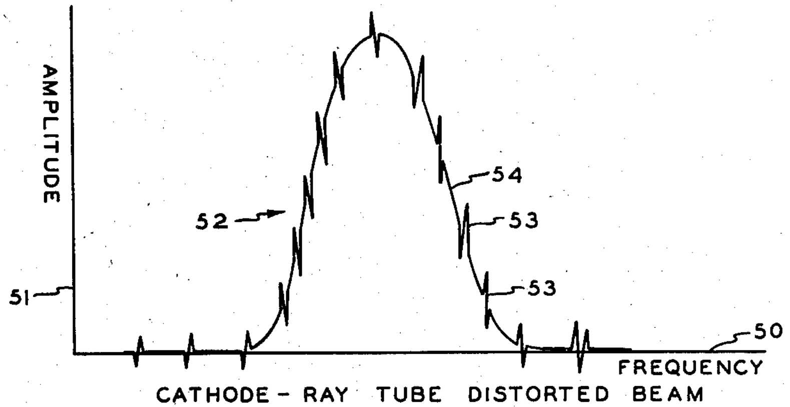
Figure 2 is a view showing the path of a beam of a cathode ray tube, according to the invention.

Referring now more particularly to Figure 2 of the accompanying drawings, the line 50 represents the horizontal, or frequency, axis on the fact of the C. R. T. The line 51 represents the signal amplitude or vertical axis. The trace 52 represents the path of the beam of cathode ray tube 38 in response to detected signal, supplied by detector 44, and to velocity modulation pulses 47. The short vertical pulses 53 represent response to the velocity modulation pulses alone, while the element 54 of the trace represent the main trace, due only to video signal supplied by detector 44.

Figure 3:
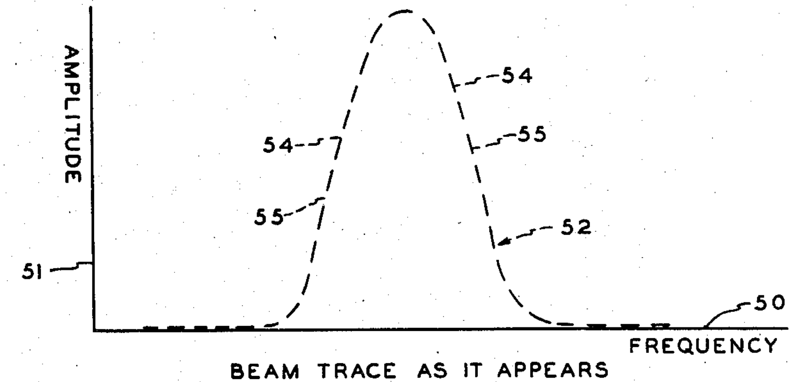
Figure 3 illustrates the appearance of a trace on the face of a cathode ray tube, as produced by a beam taking the path illustrated in Figure 2.

While Figure 2 illustrates beam motion it fails to represent the actual appearance of a trace. The latter is shown in Figure 3 of the accompanying drawings, and blank elements 55 are perceived to replace the pulses 53.

Figure 4:
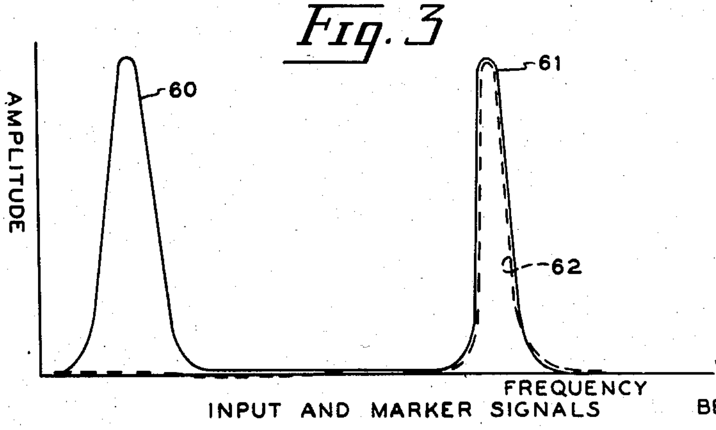
Figure 4 illustrates two traces on the face of a cathode ray tube, one of which is modulated as in Figure 3 of the accompanying drawings, and the other of which is unmodulated.

Figure 4 illustrates the visual response on the face of cathode ray tube 38 due to two marker pips 60, 61, one in response to frequency divided down from $F_1$ and the other to frequency divided down from $F_2$, and which are separated by a suitable frequency interval. It will be observed that the marker pips are separated by a suitable frequency interval, so that they appear as distinct, readily distinguishable visual marks. An input signal is indicated at 62, in substantial superposition of signal 61, and of similar amplitude. Despite the similarity of the superposed signals they are readily distinguishable, since they are traced in succession, and not simultaneously, and since one of the traces periodically interrupted, and the other is not.

While we have described and illustrated one specific example of the present invention, it will become apparent that variations of the specific details of construction may be resorted to without departing from the true scope and spirit of the invention as defined in the appended claims.

What we claim is:

1. In combination, a source of first signal, a source of comparison signal, where said first and said comparison signal may have substantially similar frequency and amplitude, a spectrum analyzing visual indicator system for visually indicating the frequencies and relative amplitudes of said first signal and said comparison signal, said visual indicator system including a cathode ray device, means for applying said first signal and said comparison signal in sequence to said cathode ray device, and means for velocity modulating the visual trace of only one of said signals at a plurality of spaced points along said trace.

2. In combination, a spectrum analyzer, a source of first comparison signal, a source of second comparison signal, a source of input signal, a synchronizing source, means responsive to said synchronizing signal for supplying said first and second comparison signals in alternation to said spectrum analyzer as a comparison spectrum, and means responsive to said synchronizing source for channeling said comparison spectrum and said input signal in alternation to said spectrum analyzer.

3. The combinaton in accordance with claim 2, wherein the duration of supply of said input signal to said spectrum analyzer is twice that of each of said comparison signals.

4. The combination in accordance with claim 2, wherein the duration of supply of said input signal to said spectrum analyzer is an integral number, at least two, greater than the duration of supply of each of said comparison signals.

5. A system for plotting an amplitude varying signal against a time axis as a visual mark, comprising means for recurrently varying the amplitude of said signal at a rapid rate during said plot, said system having a maximum rate of effective plotting, said rapid rate being greater than said maximum rate of effective plotting.

6. A method of characterizing a trace on the face of a cathode ray tube, said tube having a cathode ray beam, means for directing said beam against a visual surface, and means for deflecting said beam to generate said trace, comprising the step of varying the position of said beam relative to said trace at recurrent intervals during generation of said trace at a velocity at least sufficiently great to visually modify the intensity of said trace.

7. A spectrum analyzer comprising a first crystal controlled oscillator, a second crystal controlled oscillator, a gate, a frequency divider chain, means for controlling said gate to direct output signals from said oscillators in alternation to said frequency divider chain, whereby said frequency divider chain provides a reference spectrum, a frequency scanning spectrum analyzer, a source of input signal, means for applying said input signal and said reference spectrum in alternation to said spectrum analyzer, and means for completing a scan of said spectrum analyzer during each application of said input signal and of said reference spectrum to said spectrum analyzer.

8. In combination, a source of first signal at first frequency, a source of second signal at second frequency, a frequency scanning spectrum analyzer having an input circuit and a cathode ray tube indicator, said cathode ray tube indicator having a cathode ray beam and means for deflecting said cathode ray beam to provide a visual trace, means for applying said first and second signals in alternation to said input circuit, means for effecting a scan of said spectrum analyzer during each application of each of said first and second signals to said input circuit, and means for periodically velocity modulating said cathode ray beam only during application of one of said first and second signals to said input circuit at a velocity and periodicity adequate to modulate the intensity of said visual trace at a multiplicity of points thereof 9. The combination in accordance with claim 7, wherein is provided means for modulating the amplitude of said input signal recurrently at a high rate and at relatively low amplitude.

10. The combination in accordance with claim 7, wherein is provided a cathode ray tube indicator having means for generating a cathode ray beam, means for deflecting said beam in one coordinate direction and means for deflecting said beam in another coordinate direction, wherein each scan of said spectrum analyzer is accompanied by a scan of said means for deflecting said beam in said one coordinate direction.

11. A spectrum analyzer comprising a first reference oscillator, a second reference oscillator, a gate, an output lead, means for controlling said gate to supply periodic signals controlled in period by said first and second reference oscillators in alternation to said output lead, to provide a reference spectrum, a frequency scanning spectrum analyzer, a source of input signal, means for applying said input signal and said reference spectrum in alternation to said spectrum analyzer, and means for completing a scan of said spectrum analyzer during each application of said input signal and of each of said periodic signals, respectively, to said spectrum analyzer.

12. The combination according to claim 11, wherein is provided means for amplitude modulating one of said reference spectrum and said input signal at a rate which is rapid in comparison with the time of one scan.

13. A spectrum analyzer comprising a first reference oscillator, a second reference oscillator, a first lead, means for supplying to said first lead in alternation periodic signals synchronized with the outputs of said first and second reference oscillators, a source of input signal, a second lead, means for supplying to said second lead in alternation said periodic signals and said input signal, a cathode ray tube indicator having means for generating a cathode ray beam, first deflection means for deflecting said beam in one direction, second deflection means for deflecting said beam in another direction, means for applying a separate deflection signal to said first deflection means during supply to said second lead of each of said periodic signals and of said input signal, means for supplying signal from said second lead to said second deflection means, and means for amplitude modulating the signal applied to said second deflection means periodically at a high rate during certain ones of said separate deflection signals only, said beam having a maximum effective writing speed and said high rate being sufficiently high to move said beam at a speed substantially greater than said maximum effective writing speed.

14. A spectrum analyzer comprising a first source of frequency $F_1$, a second source of frequency $F_2$, a periodic gating signal source, a first divider chain, means responsive to said gating signal for connecting said first source of frequency $F_1$ and said second source of frequency $F_2$ to said first divider chain in alternation to provide two frequency references at the output of said first divider chain, a source of input signal, means for deriving a further periodic gating signal from said periodic gating signal source by frequency division, an output lead and means for applying both frequency references and said input signal to said output lead in alternation in response to said further periodic gating signal.

15. The combination in accordance with claim 14. wherein is further provided a spectrum analyzer having frequency scanning means and display means, means for connecting said output lead to said frequency scanning means, means for synchronizing said frequency scanning means to provide recurrent scans in response to and in synchronism with said first-mentioned periodic gating signal.

16. The combination according to claim 7, wherein is provided means for effecting rapid amplitude modulation of only one of the signals on said output lead at a rate far above said scanning rate.

17. The combination according to claim 16, wherein said means for amplitude modulating includes a source of modulating signal comprising another divider chain responsive to one of said divider chains.

References Cited in the file of this patent

UNITED STATES PATENTS

| | | |
|---|---|---|
| 2,300,999 | Williams | Nov. 3, 1942 |
| 2,432,196 | Hershberger | Dec. 9, 1947 |
| 2,465,355 | Cook | Mar. 29, 1949 |
| 2,547,289 | Smart | Apr. 3, 1951 |
| 2,565,839 | Broadwell et al. | Aug. 28, 1951 |
| 2,577,758 | Hastings | Dec. 11, 1951 |
| 2,662,197 | Le Comte | Dec. 8, 1953 |
| 2,678,406 | Beale | May 11, 1954 |
| 2,731,583 | Ellis | Jan. 17, 1956 |